US012651364B2

(12) United States Patent
Orentas

(10) Patent No.: US 12,651,364 B2
(45) Date of Patent: Jun. 9, 2026

(54) METHOD AND SYSTEM FOR ESTIMATING THE LENGTH OF A VESSEL

(71) Applicant: Traffipax, LLC, Jupiter, FL (US)

(72) Inventor: Tadas Orentas, Jupiter, FL (US)

(73) Assignee: Jenoptik Smart Mobility Solutions, LLC, Jupiter, FL (US)

( * ) Notice: Subject to any disclaimer, the term of this patent is extended or adjusted under 35 U.S.C. 154(b) by 444 days.

(21) Appl. No.: 18/129,336

(22) Filed: Mar. 31, 2023

(65) Prior Publication Data

US 2024/0331183 A1 Oct. 3, 2024

(51) Int. Cl.
*G06T 7/62* (2017.01)

(52) U.S. Cl.
CPC ...... *G06T 7/62* (2017.01); *G06T 2207/30196* (2013.01); *G06T 2207/30232* (2013.01)

(58) Field of Classification Search
CPC ............. G06T 7/62; G06T 2207/30196; G06T 2207/30232; G06T 7/73; G06T 7/60; G06V 10/22; G06V 20/52
See application file for complete search history.

(56) References Cited

U.S. PATENT DOCUMENTS

| | | | | |
|---|---|---|---|---|
| 11,049,230 B2 * | 6/2021 | Bai | ......................... | G06T 12/20 |
| 2011/0142318 A1 * | 6/2011 | Chen | ................... | G06V 10/446 |
| | | | | 382/131 |
| 2011/0222737 A1 * | 9/2011 | Biskup | ...................... | G06T 7/62 |
| | | | | 382/110 |
| 2017/0154425 A1 * | 6/2017 | Pierce | .................. | G06V 10/255 |
| 2019/0195616 A1 * | 6/2019 | Cao | ....................... | G06T 1/0014 |
| 2021/0077195 A1 * | 3/2021 | Saeidi | .................... | A61B 34/10 |
| 2021/0150456 A1 * | 5/2021 | Cho | ..................... | G06K 7/1413 |
| 2022/0122247 A1 * | 4/2022 | Koehler | .................. | G06T 7/38 |
| 2022/0156904 A1 * | 5/2022 | Manhart | .............. | A61B 5/0033 |

OTHER PUBLICATIONS

Tan et al, ("a Computer Vision System for Monitoring Vessel Motion in Conjunction with Vessel Wake Measurements", IEEE 2012, pp. 1830-1834) (Year: 2012).*

* cited by examiner

*Primary Examiner* — Amara Abdi
(74) *Attorney, Agent, or Firm* — Muncy, Geissler, Olds & Lowe, P.C.

(57) ABSTRACT

A method for estimating at least a length of a vessel comprises monitoring of a scene by a camera, wherein the camera provides a first plurality of two-dimensional images of the scene At least one reference object is detected in at least one two-dimensional image of the first plurality of two-dimensional images and a pixel position and at least a pixel width of each of the reference objects are determined. Further, at least a width scaling model is created. Further, the camera provides a second plurality of two-dimensional images of the scene and at least one vessel is detected in at least one two-dimensional image of the second plurality of two-dimensional images. A pixel position and at least a pixel width of the vessel are determined in the respective two-dimensional image and a vessel length estimation for the vessel is derived from the width scaling model.

14 Claims, 6 Drawing Sheets

100

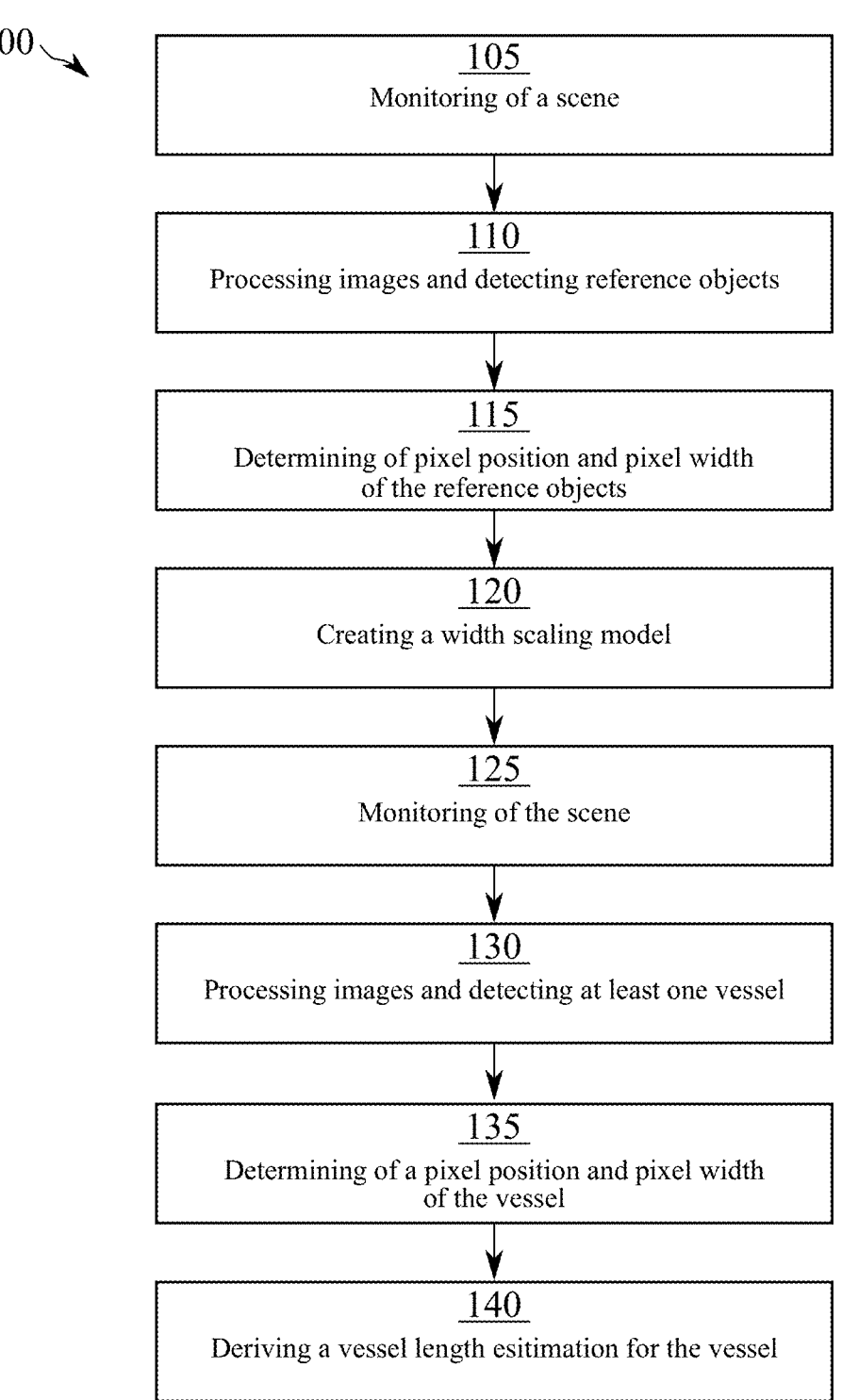

105
Monitoring of a scene

110
Processing images and detecting reference objects

115
Determining of pixel position and pixel width
of the reference objects

120
Creating a width scaling model

125
Monitoring of the scene

130
Processing images and detecting at least one vessel

135
Determining of a pixel position and pixel width
of the vessel

140
Deriving a vessel length esitimation for the vessel

METHOD AND SYSTEM FOR ESTIMATING THE LENGTH OF A VESSEL

FIELD OF THE INVENTION

The present disclosure generally relates to digital image processing, and more particularly to estimating an object's dimensions based on an appearance of said object in a digital image.

BACKGROUND

In the context of automated object recognition, technically complex and expensive systems are used to determine the size of recognized objects. In particular, these systems can comprise a plurality of cameras and/or sensors such as distance sensors. The components of the systems often have to be adjusted and calibrated in a complex way in order to achieve a reasonable result.

The present disclosure is directed to overcoming these and other problems of the prior art. In particular, it is a goal of the present invention to provide a method and a system for estimating at least the length of a vessel in a simple and efficient way.

SUMMARY OF THE INVENTION

Embodiments of the present invention address and overcome one or more of the above shortcomings and drawbacks, by providing a method and a system related to the estimation the size of a vessel in at least one dimension. More specifically, the techniques described herein address how to accurately obtain at least the length of a vessel by processing at least one digital image of said vessel captured by a camera.

According to a first aspect of the invention, a method for estimating at least a length of a vessel comprises monitoring of a scene by a camera, wherein the camera provides a first plurality of two-dimensional images of the scene.

Further, the method comprises processing, preferably by an image processing device, at least a portion of the two-dimensional images of the first plurality of two-dimensional images provided by the camera using an object detection algorithm in order to detect at least one reference object in at least one two-dimensional image of the first plurality of two-dimensional images wherein each reference object is assumed to have a same reference width.

Further, the method comprises using, preferably by an image processing device, at least one two-dimensional image of the first plurality of two-dimensional images in which at least one reference object was detected as a training image and determining, for each training image, a pixel position and at least a pixel width of each reference object in the respective training image.

In a preferred embodiment at least a portion or all of the two-dimensional images of the first plurality of two-dimensional images in which at least one reference object was detected can be used as training images.

Further, the method comprises creating, preferably by an image processing device, at least width scaling model based on the determined pixel positions of the reference objects and the determined pixel widths of the reference objects as well as the reference width of the reference objects. The width scaling model provides a functional relation between a pixel position and a pixel width of an object in a two-dimensional image of the scene on the one hand and a width of the object on the other hand.

Further, the method comprises monitoring of the scene by the camera, wherein the camera provides a second plurality of two-dimensional images of the scene and processing, preferably by an image processing device, at least a portion of the two-dimensional images of the second plurality of two-dimensional images provided by the camera using an object detection algorithm in order to detect at least one vessel in at least one two-dimensional image of the second plurality of two-dimensional images.

Further, a, preferably by an image processing device, pixel position and at least a pixel width of the vessel are determined in the respective two-dimensional image and, preferably by an image processing device, a vessel length estimation for the vessel is derived from the width scaling model based on the pixel position and pixel width of the vessel in the respective two-dimensional image.

Further, preferred is a method wherein a scaling model (at least the width scaling model or the height scaling model) is created based on at least 500 reference objects detected in at least one training image. It is also possible, that the scaling model is created based on more than 500 reference objects detected in at least one training image, in particular at least 1000 or at least 1500 or at least 2000 reference objects detected in at least one training image can be used to create the scaling model. For each of the reference objects a pixel position and at least a pixel width or a pixel height are determined in the respective training image in order to create the scaling model. Also, the reference objects may be obtained from a plurality of training images. It is clear in this context that the use of more objects may imply the use of more training images.

Further, preferred is a method wherein creating the width scaling model comprises creating, preferably by an image processing device, a three-dimensional width data cloud based on at least the determined reference pixel positions and reference pixel widths of the reference objects detected in at least one training image, wherein the data cloud comprises a plurality of three-dimensional data points. Each of the three-dimensional data points represents a pixel position determined for a specific reference object in a specific training image and a pixel width or a width scaling value determined for the specific reference object based on the specific training image.

Further, preferred is a method wherein creating the width scaling model comprises smoothing, preferably by an image processing device, the three-dimensional width data cloud in at least one dimension. In a preferred embodiment the width data cloud is smoothed at least in the dimension representing the pixel width or the width scaling value. In particular, the smoothing may be performed to assure a clear assignment between each pixel position of the determined pixel positions of the reference objects in the two-dimensional training images and a single pixel width or a single width scaling value.

Further, preferred is a method wherein creating the width scaling model comprises fitting, preferably by an image processing device, a width scaling surface to the smoothened three-dimensional width data cloud, wherein the width scaling surface provides a functional relation between a pixel position of an object on the one hand and a pixel width of a reference object or a width scaling value on the other hand. The fitting of the width scaling surface may comprise fitting a function of two variables to the data points of the width data cloud, wherein said function represents the width scaling surface. Preferably, the two variables of the function may represent the pixel position of the object and the value of the function determined for a specific pixel position represents the pixel width of a reference object or a width scaling value for that specific pixel position. Advantageously, the surface fitting may be performed by means of polynomial regression.

Further, preferred is a method wherein deriving a vessel length estimation from the width scaling model comprises deriving, preferably by an image processing device, a width scaling value from the width scaling model, based on the pixel position of the vessel in the respective two-dimensional image and calculating the vessel length estimation based on the derived width scaling value and the pixel width of the vessel in the respective two-dimensional image. In an embodiment of the invention, the width scaling value is derived directly from a width scaling surface. In another embodiment, a pixel width of a reference object at the pixel position of the vessel is derived from the width scaling surface and the width scaling value is calculated based on said pixel width of a reference object at the pixel position of the vessel and the reference width of the reference object.

Further, preferred is a method wherein the method further comprises, that each of the plurality of reference objects is assumed to have a same reference height.

In a preferred embodiment, the method further comprises at least one of the following:

determining, preferably by an image processing device, (additionally to the pixel width and pixel position) at least a pixel height of each reference object in the respective training image;

creating, preferably by an image processing device, a height scaling model based on the determined pixel positions of the reference objects and the determined pixel heights of the reference objects as well as the reference height of the reference objects, wherein the height scaling model provides a functional relation between a pixel position and a pixel height of an object in a two-dimensional image of the scene on the one hand and a height of the object on the other hand;

determining, preferably by an image processing device, (additionally to the pixel width of the vessel) at least a pixel height of the vessel in the respective two-dimensional image;

deriving, preferably by an image processing device, a vessel height estimation for the vessel from the height scaling model based on the pixel position and pixel height of the vessel in the respective two-dimensional image.

Further, preferred is a method wherein creating the height scaling model comprises creating, preferably by an image processing device, a three-dimensional height data cloud based on at least the determined reference pixel positions and reference pixel heights of the reference objects detected in at least one training image, wherein the data cloud comprises a plurality of three-dimensional data points. Each of the three-dimensional data points represents a pixel position determined for a specific reference object in a specific training image and at least a pixel height or a height scaling value determined for the specific reference object based on the specific training image.

Further, preferred is a method wherein creating the height scaling model comprises smoothing, preferably by an image processing device, the three-dimensional height data cloud in at least one dimension. In a preferred embodiment the height data cloud is smoothed at least in the dimension representing the pixel height or the height scaling value. In particular, the smoothing may be performed to assure a clear assignment between each pixel position of the determined pixel positions of the reference objects in the two-dimensional training images and a single pixel height or a single height scaling value.

Further, preferred is a method wherein creating the height scaling model comprises fitting, preferably by an image processing device, a height scaling surface to the smoothened three-dimensional height data cloud, wherein the height scaling surface provides a functional relation between a pixel position of an object on the one hand and a pixel height of a reference object or a height scaling value on the other hand. The fitting of the height scaling surface may comprise fitting a function of two variables to the data points of the height data cloud, wherein said function represents the height scaling surface. Preferably, the two variables of the function may represent the pixel position of the object and the value of the function determined for a specific pixel position represents the pixel height of a reference object or a height scaling value for that specific pixel position. Advantageously, the surface fitting may be performed by means of polynomial regression.

Further, preferred is a method wherein deriving a vessel height estimation from the height scaling model comprises deriving, preferably by an image processing device, a height scaling value from the height scaling model preferably from a height scaling surface, based on the pixel position of the vessel in the respective two-dimensional image and calculating the vessel height estimation based on the derived height scaling value and the pixel height of the vessel in the respective two-dimensional image. In an embodiment of the invention, the height scaling value is derived directly from the height scaling model. In another embodiment, a pixel height of a reference object at the pixel position of the vessel is derived from the height scaling model and the height scaling value is calculated based on said pixel height of a reference object at the pixel position of the vessel and the reference height of the reference object.

It may be advantageous to combine a height scaling model and a width scaling model in a single scaling model. The reason for that is, that at least some of the data of the width scaling model and the height scaling model are redundant, such as the pixel positions of the reference objects for each of which a pixel height and a pixel width of the reference object was determined. A (combined) scaling model may comprise creating a multidimensional data cloud based on at least the determined pixel positions, pixel widths and pixel heights of the reference objects, wherein the data cloud comprises a plurality of multi-dimensional data points, wherein each of the data points represents a pixel position determined for a specific reference object in a specific training image and at least a pixel width or a width scaling value and a pixel height or a height scaling value determined for the specific reference object based on the specific training image.

Creating a (combined) scaling model may further comprise smoothing the scaling model in at least one dimension. In a preferred embodiment, the scaling model is smoothed in at last two dimensions. Preferably, the scaling model may be smoothened in at least the dimension representing the pixel width or the width scaling value and the dimension representing the pixel height or the height scaling value.

In a preferred embodiment of the method, creating a (combined) scaling model may further comprise fitting at least a width scaling surface to the smoothened multidimensional data cloud or fitting a height scaling surface to the smoothened multidimensional data cloud. When fitting the width scaling surface, data from the scaling model representing height may be neglected. When fitting the height scaling surface, data from the scaling model representing width may be neglected.

The method can advantageously further comprise that detecting the reference objects comprises detecting humans as the reference objects. In other words, it may be advantageous to use humans as reference objects. In this context it may be advantageous to assume, that each human has the same width. The width of a human can be assumed to be between 1 ft and 3 ft. Preferably, the width of a human can be assumed to be between 1.5 ft and 2.5 ft. In a very preferred embodiment, the width of a human may be assumed to be 2 ft.

The method can advantageously further comprise that monitoring the scene comprises monitoring at least a portion of a passageway for vessels. In other words, it may be advantageous if the scene is set on a passageway for vessels, such that vessels passing through the scene along the passageway can be detected and at least their length can be estimated. For example, the scene may include at least a part of a canal or river. Additionally or alternatively, the scene may for example comprise at least a portion of a harbor, in particular at least a portion of a harbor entrance.

Further, preferred is a method wherein the pixel width of a reference object is determined as the pixel width of a bounding rectangle of the reference object, wherein the bounding rectangle represents the maximum extents of the reference objects in the respective two-dimensional training image. Additionally or alternatively, the pixel width of a vessel is determined as the pixel width of a bounding rectangle of the vessel, wherein the bounding rectangle represents the maximum extents of the vessel in the respective two-dimensional image.

Further, preferred is a method wherein the pixel height of a reference object is determined as the pixel height of a bounding rectangle of the reference object, wherein the bounding rectangle represents the maximum extents of the reference objects in the respective two-dimensional training image. Additionally or alternatively, the pixel height of a vessel is determined as the pixel height of a bounding rectangle of the vessel, wherein the bounding rectangle represents the maximum extents of the vessel in the respective two-dimensional image.

According to a second aspect of the invention, a system for estimating at least a length of a vessel is provided, the system comprising a camera for monitoring a scene and obtaining two-dimensional images from said scene as well as an image processing device operatively coupled to the camera. The image processing device comprises a processor and a memory operatively coupled to the processor, wherein the memory stores instructions causing the processor to perform operations comprising:

processing at least a portion of a first plurality of two-dimensional images provided by the camera using an object detection algorithm in order to detect at least one reference object in at least one two-dimensional image of the first plurality of two-dimensional images wherein each reference object is assumed to have a same reference width;

using at least one two-dimensional image of the first plurality of two-dimensional images in which at least one reference object was detected as a training image and determining, for each training image, a pixel position and at least a pixel width of each reference object in the respective training image;

creating a width scaling model based on the determined pixel positions of the reference objects and the determined pixel widths of the reference objects as well as the reference width of the reference objects, wherein the width scaling model provides a functional relation between a pixel position and a pixel width of an object in a two-dimensional image of the scene on the one hand and a width of the object on the other hand;

processing at least a portion of a second plurality of two-dimensional images provided by the camera using an object detection algorithm in order to detect at least one vessel in at least one of the two-dimensional images of the second plurality of two-dimensional images;

determining a pixel position and at least a pixel width of the vessel in the respective two-dimensional image;

deriving a vessel length estimation for the vessel from the width scaling model based on the pixel position and pixel width of the vessel in the respective two-dimensional image.

The system according to the second aspect of the invention is preferably adapted to perform at least some operations of a method for estimating at least a length of a vessel according to the first aspect of the invention.

In a preferred embodiment, the camera is a camera providing a resolution of at least 3840 pixels in width and at least 2160 pixels in height.

According to a third aspect of the invention, a non-transitory computer readable storage medium is provided, wherein the non-transitory computer readable storage medium has instructions stored thereon which, when executed by a processor, cause the processor to perform operations comprising:

processing at least a portion of a first plurality of two-dimensional images provided by the camera using an object detection algorithm in order to detect at least one reference object in at least one two-dimensional image of the first plurality of two-dimensional images wherein each reference object is assumed to have a same reference width;

using at least one two-dimensional image of the first plurality of two-dimensional images in which at least one reference object was detected as a training image and determining, for each training image, a pixel position and at least a pixel width of each reference object in the respective training image;

creating a width scaling model based on the determined pixel positions of the reference objects and the determined pixel widths of the reference objects as well as the reference width of the reference objects, wherein the width scaling model provides a functional relation between a pixel position and a pixel width of an object in a two-dimensional image of the scene on the one hand and a width of the object on the other hand;

processing at least a portion of a second plurality of two-dimensional images provided by the camera using an object detection algorithm in order to detect at least one vessel in at least one of the two-dimensional images of the second plurality of two-dimensional images;

determining a pixel position and at least a pixel width of the vessel in the respective two-dimensional image;

deriving a vessel length estimation for the vessel from the width scaling model based on the pixel position and pixel width of the vessel in the respective two-dimensional image.

The non-transitory computer readable storage medium according to the third aspect of the has preferably instructions stored thereon which, when executed by a processor, cause the processor to perform at least some operations of a method for estimating at least a length of a vessel according to the first aspect of the invention.

BRIEF DESCRIPTION OF THE DRAWINGS

The foregoing and other aspects of the present invention are best understood from the following detailed description when read in connection with the accompanying drawings. For the purpose of illustrating the invention, there are shown in the drawings embodiments that are presently preferred, it being understood, however, that the invention is not limited to the specific instrumentalities disclosed. Included in the drawings are the following Figures:

FIG. 1 illustrate a method for estimating at least a length of a vessel;

DETAILED DESCRIPTION

Figure 2:
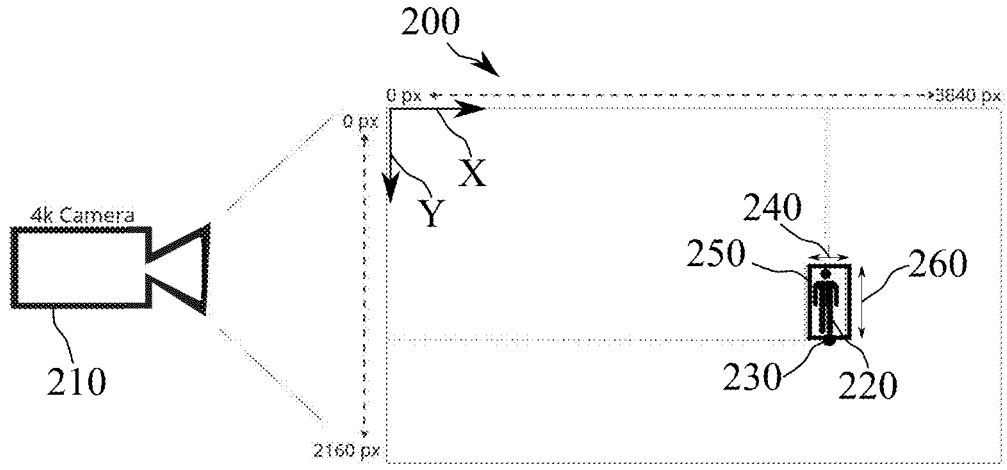
FIG. 2 illustrates a reference object in a two-dimensional training image.

Systems, methods, and storage mediums are described herein which relate generally to the estimation of at least a length of a vessel. Briefly, the techniques described herein may be understood as entailing two distinct steps. First, a scaling model is created based on a plurality of two-dimensional training images of a scene obtained by a camera. Second, using this scaling model, two-dimensional images of the same scene are processed, wherein at least one vessel is detected in at least one of said two-dimensional images and based on the scaling model, a length of the vessel detected in the two-dimensional image is estimated.

FIG. 1 illustrates a method 100 for estimating at least a length of a vessel. Starting at step 105, a scene is monitored by a camera, wherein the camera provides a first plurality of two-dimensional images of the scene. In other words, the scene is monitored by the camera over time and provides a plurality of two-dimensional images of the scene. At least a portion of the images of the first plurality of images is subsequently processed for training purposes. In particular, at least a portion of the images is processed targeting a generation of at least a width scaling model for the scene monitored by the camera.

At step 110, at least a portion of the two-dimensional images of the first plurality of two-dimensional images provided by the camera is processed using an object detection algorithm in order to detect at least one reference object in at least one two-dimensional image of the first plurality of two-dimensional images.

As an object detection algorithm, a computer vision object detector such as Caffe, YOLO, SSD or R-CNN may be used. Also, a modified version of one of said algorithms may be used. The object detection algorithm may be based on a convolutional neural network (CNN). It is possible that the same object detection algorithm is used for a detection of reference objects and vessels. However, it is also possible to use different object detection algorithms for the detection of reference objects and the detection of vessels.

In the course of the detection of an object, the object detection algorithm may provide one or more parameters relating to the object. These parameters may comprise a classification of the object by which a user can identify which object type was detected, a pixel position of the object in the image, the size of a bounding rectangle around the object and/or a level of confidence relating to the identification of an object. The level of confidence is a parameter which represents the probability, that the detected object really is an object of the desired type. The level of confidence can for example be expressed as a relative value between 0 and 1, wherein 0 means, that the object is sure not of the desired type and 1 means that the object sure is of the desired type. It may be provided, that an object detection is only considered valid, if the level of confidence is above a certain threshold. The threshold may be set to at least 0.8, preferably at least 0.9 or at least 0.95. A confidence level threshold above 0.95 is also possible.

Prior to processing the images provided by the camera, an object detection algorithm may be trained on a detection of a certain object type such as reference objects and/or vessels. It has proven advantageous to perform a training of the object detection algorithm based on at least 500 images containing the object type to be detected by the object detection algorithm. The training can be performed using any training methods known by those skilled in the art or a combination thereof. In other words, it is possible that two different instances of an object detection algorithm are used, wherein each of the instances is trained on the detection of a specific object type. For example, one instance, used for reference object detection, was trained on a detection of reference objects and another instance, used for vessel detection, was trained on the detection of vessels.

Each of the reference objects is assumed to have a same reference width. In other words, it is assumed that the real width of each of the detected reference objects is the same (the reference width). This allows to provide a reference which is used for scaling when providing an estimation about a vessel's width.

Next, at step 115 at least one two-dimensional image of the first plurality of two-dimensional images in which at least one reference object was detected is used as a training image. For each training image, a pixel position and at least a pixel width is determined for each reference object in the respective training image.

In step 120 at least a width scaling model is created based on the determined pixel positions of the reference objects and determined pixel widths of the reference objects. The width scaling model provides a functional relation between a pixel position and a pixel width of an object in a two-dimensional image of the scene on the one hand and a width of the object on the other hand.

Subsequently, in step 125 the scene is once again monitored by the camera, wherein the camera provides a second plurality of two-dimensional images. At step 130, at least a portion of the two-dimensional images of the second plurality of two-dimensional images is processed using an object detection algorithm in order to detect at least one vessel in at least one of the two-dimensional images of the second plurality of two-dimensional images.

In order to estimate the vessel's length, at step 135 a pixel position and at least a pixel width of the vessel is determined in the respective two-dimensional image and at step 140 a vessel length estimation for the vessel is derived from the width scaling model based on the pixel position and pixel width of the vessel in the respective two-dimensional image.

The method according to the present invention offers the advantage, that only simple technical setup is required comprising a single camera. There is no need for a complex adjustment of different technical components. Also, the scaling model can easily be adapted for a different scene and therefore the method may easily be applied at different locations.

FIG. 2 illustrates a reference object 220 in a two-dimensional training image 200. The training image 200 was provided by a camera 210, wherein the camera 210 is a 4k camera providing images at a resolution of 3840 pixels (px) in width and 2160 px in height. The training image 200 includes at least one reference object 220 which was detected by means of an object detection algorithm.

The scene in FIG. 2 is shown in a simplified way. A scene can be for example set to include at least a portion of a passageway for vessel. For example, the scene may be set to include at least a portion of a canal or river. Also, it is possible that the scene comprises at least a portion of a harbor, preferably at least a portion of a harbor entrance. As can also be seen from FIG. 2, humans (persons) are being used as reference objects. Humans represent good reference objects 220, since the width of humans does not vary much on average. Of course, variations due to a changing orientation of a human relative to the camera must be accepted However, it has been shown, that this inaccuracy can be accepted and that a reliable scaling model can nevertheless be determined using the method of the present invention.

The use of other reference objects than humans is generally possible. In an embodiment of the invention, cars are used as reference objects. In another preferred embodiment of the invention, cargo containers are used as reference objects. Cargo containers are standardized in their size and are therefore well suited to be used as reference objects in order to provide a reliable scaling model. It is also conceivable that, within the scope of the invention, different objects are used simultaneously as reference objects. In this case, it may be preferred if a certain reference width and/or reference height is assigned to each type of objects used as reference objects.

As a matter of simplification, only one reference object 220 is shown in FIG. 2. Of course, a plurality of reference objects 220 may be included in a single training image 200 and/or a plurality of training images 200. Preferably, different reference objects 220 may be located at different pixel positions in the scene. Using reference objects 220 at many different pixel positions 230 distributed all over the scene generally allows for the generation of a scaling model with a higher accuracy in terms of estimating a vessel's length as a more reliable scaling can be performed for a greater portion of the scene.

Each reference object 220 is assumed to have a same reference width. It is to be understood, that this assumption is often a simplification. For example, when using humans as reference objects, it is obvious that different humans may be of a different width. Also, the pixel width 240 of a detected reference object 220 may somehow vary dependent on the orientation of the reference object relative to the camera 210. However, the range in which the width of humans varies is comparably small and therefore the assumption of a constant reference width is reasonably accurate. Also, by using a plurality of reference objects 220 and/or at least smoothing or averaging the data, scatter can be reduced to a reasonable level and accuracy can be improved. In a further embodiment it may additionally be assumed, that each reference object is assumed to have a same reference height.

For the reference object 220 in the training image 200 a bounding rectangle 250 is determined, wherein the bounding rectangle 250 represents the maximum extents of the reference object 220 in the training image 200. Based on the bounding rectangle 250 a pixel position 230 and at least a pixel width 240 of the reference object 220 in the training image 200 are determined. As described later, also a pixel height 260 of the reference object 220 may be obtained from the training image 200.

The pixel position 230 of the reference object 220 refers to a specific pixel position of the bounding rectangle. In the example shown in FIG. 2, the pixel position 230 refers to the center of the lower horizontal edge of the bounding rectangle 250 of the reference object 220. The pixel position 230 provides information about where exactly the reference object 220 is located with regard to the X-direction and Y-direction of the two-dimensional training image 200, wherein the X-direction represents the width of the image 200 and the Y-direction represents the height of the image 200. Referring exemplarily to FIG. 2, the pixel position 230 of the reference object 220 is (X, Y)=(3000, 1800), which means that the reference object 220 is located at a position counting 3000 pixels in widths and 1800 pixels in height, starting from a corner point of the two-dimensional image 200 marking the point (X,Y)=(0,0).

The pixel width 240 of the reference object 220 describes the horizontal extension of the reference object 220 in the training image 200 along the X-direction. The pixel height 260 of the reference object 220 describes the vertical extension of the reference object 220 in the training image along the Y-direction. The pixel width 240 of the reference object 220 in the training image 200 is determined as the pixel width 240 of the bounding rectangle 250 of the reference object 220. Also, the pixel height 260 of the reference objects 220 in the training image 200 is determined as the pixel height 260 of the bounding rectangle 250 of the reference object 220.

FIGS. 3 to 8 illustrate the generation of a width scaling model based on the determined pixel positions of the reference objects and the determined pixel widths of the reference objects as well as the reference width of the reference objects, wherein the width scaling model provides a functional relation between a pixel position and a pixel width of an object in a two-dimensional image of the scene on the one hand and a width of the object on the other hand.

Figure 3:
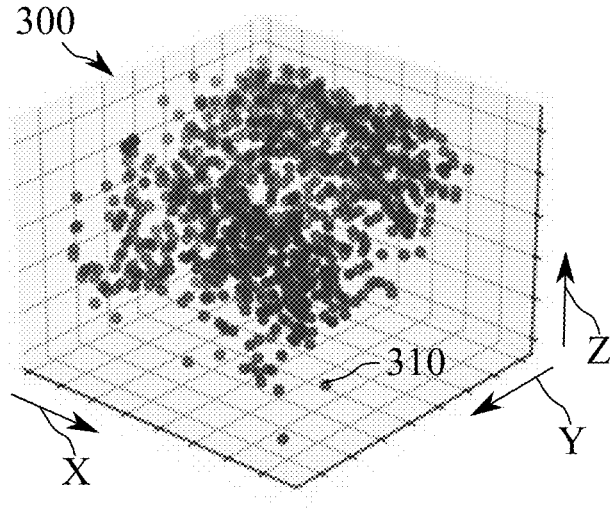
FIG. 3 illustrates a three-dimensional data cloud.

FIG. 3 illustrates a three-dimensional data cloud 300 created from the pixel widths and pixel positions determined for the reference objects detected in the training image or training images. The three-dimensional data cloud 300 comprises a plurality of three-dimensional data points 310, wherein each of the three-dimensional data points 310 represents a pixel position determined for a specific reference object in a specific training image and a pixel width or a width scaling value determined for the specific reference object based on the specific training image. With regard to FIG. 3, the pixel position is represented by the X and Y value of a data point and the pixel width is represented by the Z value of said data point.

FIG. 3 shows that some pixel positions (X, Y) can be assigned to more than one points with different Z values. In other words, some X and Y intersection points (pixel positions) have several entries for a person's width (Z-axis). This results from the fact that, although a constant reference width is assumed for the reference objects, in reality these have a certain scatter with regard to their width. Different orientations of reference objects in the scene can also contribute to this effect. In order to generate a reliable scaling model, the data is therefore smoothed in order to find the median average value for Z on a specific X, Y intersection point. By smoothening the data shown in FIG. 3 a clear assignment between each pixel position (X, Y) and a specific pixel width or a specific width scaling value is assured.

FIGS. 4 to 7 illustrate a stagewise smoothing of the three-dimensional data cloud shown in FIG. 3, wherein the smoothing was applied to the Z dimension representing the pixel width of the reference objects detected in at least one training image. It is to be understood, that a similar or same smoothing process may be applied to a data cloud, where the Z-axis represents the pixel height of a reference object or a height scaling value. Further, additional or different smoothing operations than those described in the following may be applied.

In the course of the present invention, smoothing was performed in a multi-stage process which is described in the following. It is to be understood, that all or only some of the smoothing operations described in the following may be performed.

Figures 4, 5:
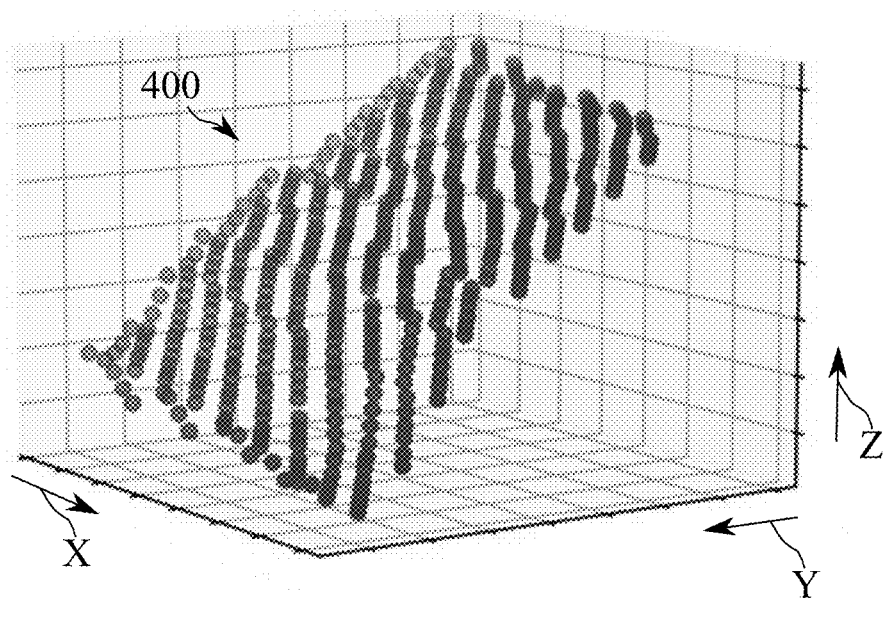
FIG. 4 illustrates a three-dimensional data cloud after a first stage of smoothing.
FIG. 5 illustrates a three-dimensional data cloud after a second stage of smoothing.
Figure 6:
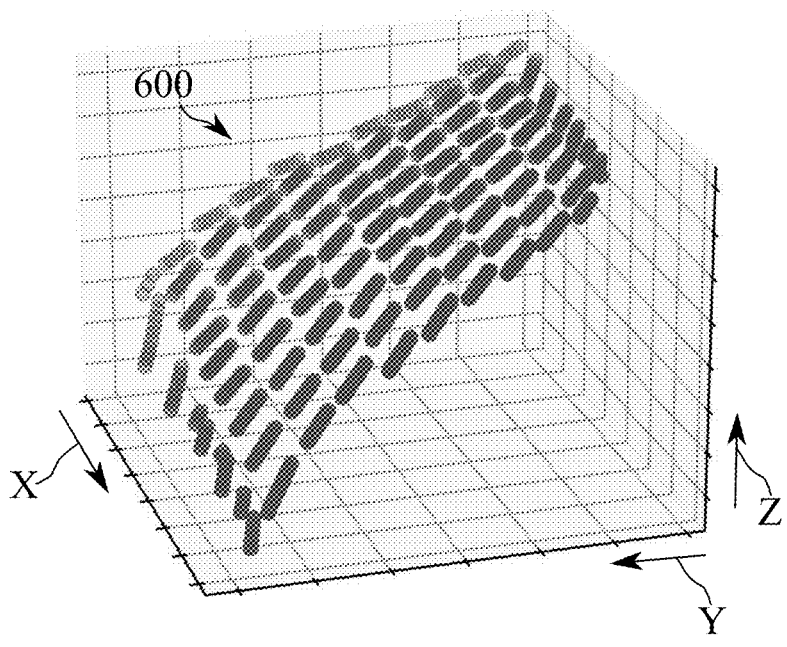
FIG. 6 illustrates a three-dimensional data cloud after a third stage of smoothing.
Figure 7:
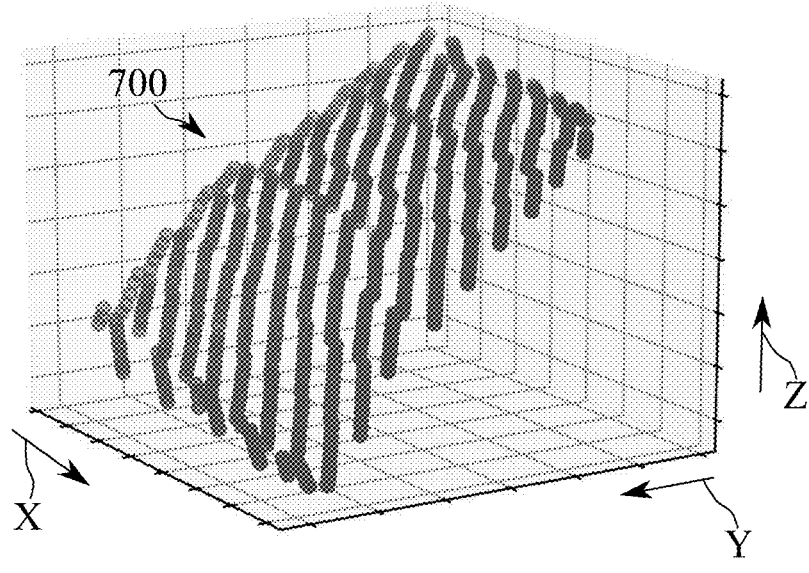
FIG. 7 illustrates a three-dimensional data cloud after a fourth stage of smoothing.

In a first stage of smoothing, a point reduction was performed, wherein the area of the image, representing all possible pixel positions, is divided in a plurality of subareas wherein each subarea represents a part of the area of the image. For example, if the image has a resolution of 3840 pixels in width and 2160 pixels in height, the image area of 3840×2160 pixels can be divided in subareas of 60×30 pixels. Then, for each subarea, the data points which are located in the subarea are determined. Then, from all data points located in a specific subarea, an average data point is determined. The average data point of a subarea may be determined by averaging (e.g. by calculating the arithmetic mean) the Z values (e.g. the pixel widths) of all data points located in said subarea. Further, in an embodiment of the invention, the average data point of a subarea may relate to a single pixel position located in said subarea, e.g. the center of said subarea. Since the data points in each subarea is reduced to a single data point (the average data point of said subarea), the total number of data points is efficiently reduced. An exemplary three-dimensional data cloud 400 is shown in FIG. 4, wherein the data point cloud of FIG. 4 was achieved by applying point reduction to the data point cloud of FIG. 3.

In a second stage of smoothing, a poly-fitting of the X-axis may be performed. In a preferred embodiment, for poly-fitting the range of the X-axis may be divided in a plurality of slices having a constant X-value, wherein preferably the slices are distributed in equidistant intervals along the X-axis. At least 4 or at least 9 or at least 10 slices may be used. Using more than 10 slices is also possible. For example, when the X-axis represents a span of 3840 pixels, a plurality of slices along the X-axis may be defined wherein two neighboring slices are positioned with a distance of 384 pixels. Each slice is processed through a poly-fitting sub-function p(X, Y, N) which returns the coefficients for a polynomial p(X) of degree N that is a best fit for the data in Y. The coefficients in p are in descending powers, and the length of p is N+1. The result of applying such poly-fitting of the X-axis is shown by the data point cloud 500 of FIG. 5, wherein the data point cloud of FIG. 4 was used as input.

In a third stage of smoothing, a poly-fitting of the Y-axis may be performed. In a preferred embodiment, for poly-fitting the range of the Y-axis may be divided in a plurality of slices having a constant Y-value, wherein preferably the slices are distributed in equidistant intervals along the Y-axis. At least 10, or at least 14 or at least 16 slices may be used. Using more than 16 slices is also possible. For example, when the Y-axis represents a span of 2160 pixels, a plurality of slices along the X-axis may be defined wherein two neighboring slices are positioned with a distance of 135 pixels. Each slice is processed through a poly-fitting sub-function p(Y, X, N) which returns the coefficients for a polynomial p(Y) of degree N that is a best fit for the data in X. The coefficients in p are in descending powers, and the length of p is N+1. The result of applying such poly-fitting of the Y-axis is shown by the data point cloud 600 of FIG. 6, wherein the data point cloud of FIG. 5 was used as input.

In a fourth stage of smoothing. For this stage, the area of the image, representing all possible pixel positions is again divided in a plurality of subareas wherein each subarea represents a part of the area of the image. For example, if the image has a resolution of 3840 pixels in width and 2160 pixels in height, the image area of 3840×2160 pixels can be divided in subareas of 400×100 pixels. Then, for the average coordinate sums of the subareas are distributed laterally across the X-axis, creating a more dispersed point set per subarea and consequentially across the whole point cloud. The result of applying such a smoothing operation is shown by the data point cloud 700 in FIG. 7, wherein the data point cloud of FIG. 6 was used as input.

Figure 8:
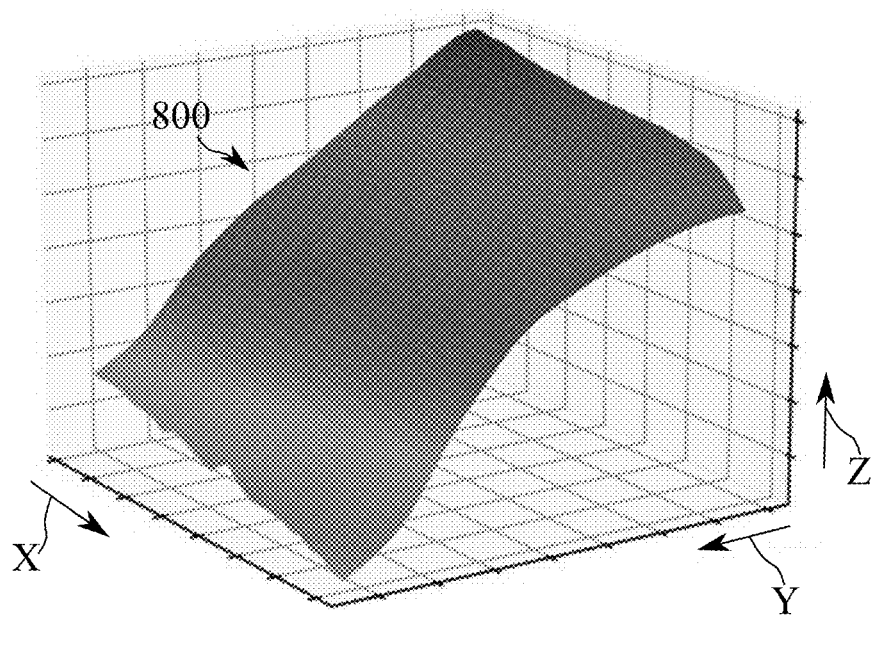
FIG. 8 illustrates a width scaling surface

As can be seen from FIG. 8, creating the width scaling model further comprises fitting a width scaling surface 800 to the smoothened three-dimensional width data cloud. Here, a width scaling surface 800 was fitted to the data points from FIG. 7. The width scaling surface provides a functional relation between a pixel position (X, Y) of an object on the one hand and a pixel width (Z) of a reference object or a width scaling value (Z) on the other hand. The fitting of the width scaling surface comprises fitting a function Z=F(X, Y) of two variables (X, Y) to the data points of the width data cloud, wherein said function represents the width scaling surface. The two variables (X, Y) of the function F(X, Y) represents the pixel position of the object and the value of the function Z determined for a specific pixel position (X, Y) represents the pixel width of a reference object or a width scaling value for that specific pixel position. The scaling surface shown in FIG. 8 was obtained by means of polynomial regression. It is to be understood, that the same or a similar surface fitting as described above can be performed in order to obtain height scaling model. The width scaling surface 800 shown in FIG. 8 can now be used to derive vessel length estimations. As the surface is determined as a polynomial function, also interpolation (or even extrapolation) for pixel positions where no data point was determined can be covered.

Figure 9:
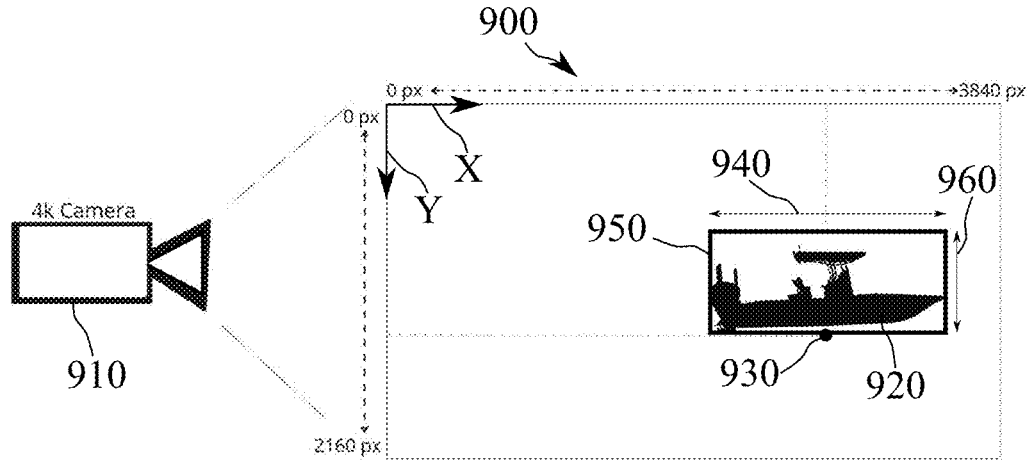
FIG. 9 illustrates a vessel in a two-dimensional image.

FIG. 9 shows an illustration of a vessel 920 in a two-dimensional image 900. The image 900 was provided by a camera 910, wherein the camera 910 is a 4k camera providing images at a resolution of 3840 pixels (px) in width and 2160 px in height. The image 900 includes at least one vessel 920 which was detected by means of an object detection algorithm.

The scene in FIG. 9 is shown in a simplified way. However, it is to be understood, that the scene in FIG. 9 is the same scene as in FIG. 3. For the vessel 920 in the image 900 a bounding rectangle 950 is determined, wherein the bounding rectangle 950 represents the maximum extents of the vessel 920 in the image 900. Based on the bounding rectangle 950 a pixel position 930 and at least a pixel width 940 of the vessel 920 in the image 900 are determined. Based on the pixel position 930 and the pixel width 940 of the vessel 920 a length estimation for the vessel can now be derived from the width scaling model which was obtained as described above.

For obtaining the vessel length estimation, the calculation is generally based on the following equation, which describes, that at a certain pixel position P in the scene defined by a pair of pixel coordinates X and Y, the ratio of the pixel width of a reference object $PW_{refObj,P}$ and the reference width $RW_{refobj}$ of said reference objects equals the ratio of the pixel width of a vessel $PW_{vessel,P}$ at the same pixel position P and the (actual width) of the vessel $W_{vessel}$:

$$\frac{PW_{refObj,P}}{RW_{refObj}} = \frac{PW_{vessel,P}}{W_{vessel}} \tag{1}$$

For obtaining a vessel height estimation, the calculation is generally based on the same approach, wherein, according to the following equation, it is assumed, that at a certain pixel position P in the scene defined by a pair of pixel coordinates X and Y, the ratio of the pixel height of a reference object $PH_{refObj,P}$ and the reference height $RH_{refObj}$ of said reference objects equals the ratio of the pixel height of a vessel $PH_{vessel,P}$ at the same pixel position P and the (actual height) of the vessel $H_{vessel}$:

$$\frac{PH_{refObj,P}}{RH_{refObj}} = \frac{PH_{vessel,P}}{H_{vessel}} \tag{2}$$

Referring to Equation 1, the pixel position 930 and the pixel width 940 of the vessel 920 are obtained from the two-dimensional image 900 provided by the camera 910. Further, the reference width of a reference object is known as it is assumed to be the same for each reference object. Using the pixel position 930 of the vessel 920, a pixel width of a reference object at that specific pixel position can directly be determined from the width scaling surface. Therefore, after determining the pixel width of a reference object at the pixel position 930 of the vessel 920 from the width scaling surface, the (actual width) of the vessel remains the only unknown in Equation 1 and can therefore be calculating as follows:

$$W_{vessel} = \frac{PW_{vessel,P}RW_{refObj}}{PW_{refObj,P}} \tag{3}$$

With regard to Equation 3, a width scaling value is included which can be defined as:

$$WSV_P = \frac{RW_{refObj}}{PW_{refObj,P}} \tag{4}$$

The width scaling value can be determined when the vessel length estimation is finally calculated. In an alternative embodiment, the width scaling value can be calculated prior to that and the width scaling model can already be based on the width scaling value. To achieve this, the (known) reference width of the reference objects can be used when creating the width scaling model. For example, the Z value of each data point in the width data cloud may represent a width scaling value as for each data point the reference width of the reference object and the pixel width are known. In this case, also the subsequent smoothing can be performed with regard to the width scaling values and the width scaling surface directly provides a width scaling value for a specific pixel position instead of a pixel width of a reference object at said pixel position. Finally, the width scaling value obtained from the width scaling surface can be used to derive the vessel length estimation as follows:

$$W_{vessel} = PW_{vessel,P}WSV_P \tag{5}$$

However, it is to be understood that this only shifts the point in time when the reference width of a reference object is considered in the calculation. The result does not change.

The same can be applied accordingly when creating a height scaling model. In accordance to the above, a height scaling value HSV can be defined as follows and may be used for creating a height scaling model and/or height scaling surface and/or for calculating the vessel height estimation:

$$HSV_P = \frac{RH_{refObj}}{PH_{refObj,P}} \tag{6}$$

$$H_{vessel} = PH_{vessel,P}HSV_P \tag{7}$$

It is to be understood from the above, that in order to obtain a vessel height estimation, generally the same acts as to obtain a vessel width estimation can be performed, wherein only pixel height values as well as a reference height are used instead of pixel width values and a reference width.

Figure 10:
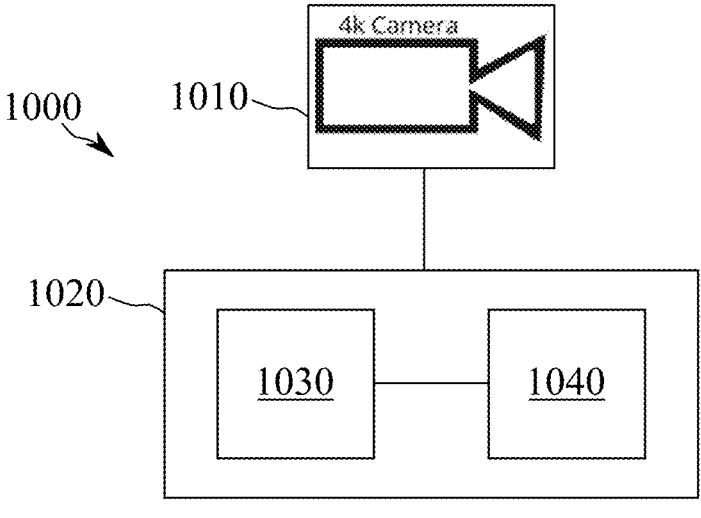
FIG. 10 illustrates a system for estimating at least a length of a vessel.

FIG. 10 further illustrates a system 1000 for estimating at least a length of a vessel according to a second aspect of the invention. The system 1000 comprises a camera 1010 for monitoring a scene and obtaining two-dimensional images from said scene as well as an image processing device 1020 operatively coupled to the camera 1010. The image processing device 1020 comprises a processor 1030 and a memory 1040 operatively coupled to the processor 1030, wherein the memory 1040 stores instructions causing the processor 1030 to perform operations comprising:

processing at least a portion of a first plurality of two-dimensional images provided by the camera using an object detection algorithm in order to detect at least one reference object in at least one two-dimensional image of the first plurality of two-dimensional images wherein each reference object is assumed to have a same reference width;

using at least one two-dimensional image of the first plurality of two-dimensional images in which at least one reference object was detected as a training image and determining, for each training image, a pixel position and at least a pixel width of each reference object in the respective training image;

creating a width scaling model based on the determined pixel positions of the reference objects and the determined pixel widths of the reference objects as well as the reference width of the reference objects, wherein the width scaling model provides a functional relation between a pixel position and a pixel width of an object in a two-dimensional image of the scene on the one hand and a width of the object on the other hand;

processing at least a portion of a second plurality of two-dimensional images provided by the camera using an object detection algorithm in order to detect at least one vessel in at least one of the two-dimensional images of the second plurality of two-dimensional images;

determining a pixel position and at least a pixel width of the vessel in the respective two-dimensional image;

deriving a vessel length estimation for the vessel from the width scaling model based on the pixel position and pixel width of the vessel in the respective two-dimensional image.

In the context of the present invention a width of an object (for example a reference object or a vessel) shall be understood as the actual horizontal extension of said object in a unit of a length. The unit of length may be for example meter of feet. Further, a reference width is to be understood as an estimated width of an object. A reference width may be assumed to be constant. In other words, it may be assumed by simplification that each object of a specific type (for example each reference object) has the same reference width.

In the context of the present invention a height of an object (for example a reference object or a vessel) shall be understood as the actual vertical extension of said object in a unit of length. The unit of length may be for example meter of feet. Further, a reference height is to be understood as an estimated height of an object. A reference height may be assumed to be constant. In other words, it may be assumed by simplification that each object of a specific type (for example each reference object) has the same reference height.

In context of the present invention a pixel width of an object (for example a reference object or a vessel) in an image shall be understood as the horizontal extension of said object in the respective image in number of pixels. For example, if an object, in relation to its horizontal extension, extends over four pixels, the pixel width of the object is four.

In context of the present invention a pixel height of an object (for example a reference object or a vessel) in an image shall be understood as the vertical extension of said object in the respective image in number of pixels. For example, if an object, in relation to its vertical extension, extends over four pixels, the pixel width of the object is four.

In context of the present invention a pixel position of an object (for example a reference object or a vessel) in an image shall be understood as a two-dimensional specification of a specific pixel in a two-dimensional image for the unambiguous determination of the position of the object. A pixel position may for example include an x-value and a y-value, wherein, the x-value represents a pixel count along a first direction (x-direction) and the y-value represents a pixel count in a second direction (y-direction). Given a two-dimensional image, this leads to a clear definition of a pixel located at the pixel position (x, y) in the two-dimensional image.

In a preferred embodiment, a pixel position may refer to a specific position on a bounding rectangle of the respective object, wherein the bounding rectangle represents the maximum extents of said objects in the respective two-dimensional image or two-dimensional training image. The point on the bounding rectangle can for example be a corner point of the bounding rectangle or the center of the rectangle. Also, the point can mark the center of one side or edge of the rectangle. Any point on a bounding rectangle is in general suitable to be used, provided that the definition is used consistently.

In context of the present invention a length estimation for a vessel shall be understood as an estimation of the actual length of the vessel in a unit of length and a height estimation shall be understood as an estimation of the actual height of the vessel in a unit of length. The unit of length may be for example meter or feet.

In context of the present invention a scene shall be understood as a specific view. The view results from the orientation and position of the camera as well as certain camera settings such as focus and zoom. In the course of the present invention it shall be understood, that the scene remains constant. In other words, the monitoring of the scene for obtaining two-dimensional training images by the camera is performed with the same orientation, position and settings of the camera as the monitoring of the scene for detecting vessels. The reason for that is, that the scaling model is tailored to a specific scene and changing the scene requires the generation of a new scaling model.

The functions and process steps described herein may be performed automatically or wholly or partially in response to user command. An activity performed automatically is performed in response to one or more executable instructions or device operation without user direct initiation of the activity.

The system and process of the figures are not exclusive. Other systems and processes may be derived in accordance with the principles of the invention to accomplish the same objectives. Although this invention has been described with reference to particular embodiments, it is to be understood that the embodiments and variations shown and described herein are for illustration purposes only. Modifications to the current design may be implemented by those skilled in the art, without departing from the scope of the invention. As described herein, the systems and methods according to the invention can be implemented using hardware components, software components and/or combinations thereof.

The invention claimed is:

1. A method for estimating at least a length of a vessel, the method comprising:

monitoring of a scene by a camera, wherein the camera provides a first plurality of two-dimensional images of the scene;

processing at least a portion of the two-dimensional images of the first plurality of two-dimensional images provided by the camera using an object detection algorithm in order to detect at least one reference object in at least one two-dimensional image of the first plurality of two-dimensional images wherein each reference object is assumed to have a same reference width;

using at least one two-dimensional image of the first plurality of two-dimensional images in which at least one reference object was detected as a training image and determining, for each training image, a pixel position and at least a pixel width of each reference object in the respective training image;

creating a width scaling model based on the determined pixel positions of the reference objects and the determined pixel widths of the reference objects as well as the reference width of the reference objects, wherein the width scaling model provides a functional relation between a pixel position and a pixel width of an object in a two-dimensional image of the scene on the one hand and a width of the object on the other hand;

monitoring of the scene by the camera, wherein the camera provides a second plurality of two-dimensional images of the scene;

processing at least a portion of the two-dimensional images of the second plurality of two-dimensional images provided by the camera using an object detection algorithm in order to detect at least one vessel in at least one of the two-dimensional images of the second plurality of two-dimensional images;

determining a pixel position and at least a pixel width of the vessel in the respective two-dimensional image; and deriving a vessel length estimation for the vessel from the width scaling model based on the pixel position and pixel width of the vessel in the respective two-dimensional image, wherein creating the width scaling model comprises:

creating a three-dimensional width data cloud based on at least the determined pixel positions and pixel widths of the reference objects, wherein the data cloud comprises a plurality of three-dimensional data points, wherein each of the data points represents a pixel position determined for a specific reference object in a specific training image and at least a pixel width or a width scaling value determined for the specific reference object based on the specific training image;

smoothing the three-dimensional width data cloud in at least one dimension; and wherein the three-dimensional width data cloud is generated from reference objects detected at different pixel positions across a plurality of training images captured at different vessel-relative distances, such that the width scaling model compensates for perspective-induced non-linear scaling across the image field.

2. The method of claim 1, wherein at least the width scaling model is created based on at least 500 reference objects detected in at least one training image.

3. A method for estimating at least a length of a vessel, the method comprising:

monitoring of a scene by a camera, wherein the camera provides a first plurality of two-dimensional images of the scene;

processing at least a portion of the two-dimensional images of the first plurality of two-dimensional images provided by the camera using an object detection algorithm in order to detect at least one reference object in at least one two-dimensional image of the first plurality of two-dimensional images wherein each reference object is assumed to have a same reference width;

using at least one two-dimensional image of the first plurality of two-dimensional images in which at least one reference object was detected as a training image and determining, for each training image, a pixel position and at least a pixel width of each reference object in the respective training image;

creating a width scaling model based on the determined pixel positions of the reference objects and the determined pixel widths of the reference objects as well as the reference width of the reference objects, wherein the width scaling model provides a functional relation between a pixel position and a pixel width of an object in a two-dimensional image of the scene on the one hand and a width of the object on the other hand;

monitoring of the scene by the camera, wherein the camera provides a second plurality of two-dimensional images of the scene;

processing at least a portion of the two-dimensional images of the second plurality of two-dimensional images provided by the camera using an object detection algorithm in order to detect at least one vessel in at least one of the two-dimensional images of the second plurality of two-dimensional images;

determining a pixel position and at least a pixel width of the vessel in the respective two-dimensional image; and deriving a vessel length estimation for the vessel from the width scaling model based on the pixel position and pixel width of the vessel in the respective two dimensional image, wherein creating the width scaling model comprises:

creating a three-dimensional width data cloud based on at least the determined pixel positions and pixel widths of the reference objects, wherein the data cloud comprises a plurality of three-dimensional data points, wherein each of the data points represents a pixel position determined for a specific reference object in a specific training image and at least a pixel width or a width scaling value determined for the specific reference object based on the specific training image;

smoothing the three-dimensional width data cloud in at least one dimension, and wherein creating the width scaling model comprises:

fitting a width scaling surface to the smoothened three-dimensional width data cloud, wherein the width scaling surface provides a functional relation between a pixel position on the one hand and a pixel width of a reference object or a width scaling value on the other hand.

4. A method for estimating at least a length of a vessel, the method comprising:

monitoring of a scene by a camera, wherein the camera provides a first plurality of two-dimensional images of the scene;

processing at least a portion of the two-dimensional images of the first plurality of two-dimensional images provided by the camera using an object detection algorithm in order to detect at least one reference object in at least one two-dimensional image of the first plurality of two-dimensional images wherein each reference object is assumed to have a same reference width;

using at least one two-dimensional image of the first plurality of two-dimensional images in which at least one reference object was detected as a training image and determining, for each training image, a pixel position and at least a pixel width of each reference object in the respective training image;

creating a width scaling model based on the determined pixel positions of the reference objects and the determined pixel widths of the reference objects as well as the reference width of the reference objects, wherein the width scaling model provides a functional relation between a pixel position and a pixel width of an object in a two-dimensional image of the scene on the one hand and a width of the object on the other hand;

monitoring of the scene by the camera, wherein the camera provides a second plurality of two-dimensional images of the scene;

processing at least a portion of the two-dimensional images of the second plurality of two-dimensional images provided by the camera using an object detection algorithm in order to detect at least one vessel in at least one of the two-dimensional images of the second plurality of two-dimensional images;

determining a pixel position and at least a pixel width of the vessel in the respective two-dimensional image; and deriving a vessel length estimation for the vessel from the width scaling model based on the pixel position and pixel width of the vessel in the respective two-dimensional image, wherein creating the width scaling model comprises:

creating a three-dimensional width data cloud based on at least the determined pixel positions and pixel widths of the reference objects, wherein the data cloud comprises a plurality of three-dimensional data points, wherein each of the data points represents a pixel position determined for a specific reference object in a specific training image and at least a pixel width or a width scaling value determined for the specific reference object based on the specific training image; and smoothing the three-dimensional width data cloud in at least one dimension, wherein deriving the vessel length estimation from the width scaling model comprises:

deriving a width scaling value from the width scaling model based on the pixel position of the vessel in the respective two-dimensional image and calculating the vessel length estimation based on the scaling value and the pixel width of the vessel, wherein the three-dimensional width data cloud is generated from reference objects detected at different pixel positions across a plurality of training images captured at different vessel-relative distances, such that the width scaling model compensates for perspective-induced non-linear scaling across the image field.

5. The method of claim 1, wherein processing at least a portion of the first plurality of two-dimensional images comprises that each reference objects is assumed to have a same reference height; and wherein the method further comprises:

determining, for each training image, at least a pixel height of each reference object in the respective two-dimensional training image;

creating a height scaling model based on the determined pixel positions of the reference objects and the determined pixel heights of the reference objects as well as the reference height of the reference objects, wherein the height scaling model provides a functional relation between a pixel position and a pixel height of an object in a two-dimensional image of the scene on the one hand and a height of the object on the other hand;

determining a pixel height of the vessel in the respective two-dimensional image;

deriving a vessel height estimation for the vessel from the height scaling model based on the pixel position and pixel height of the vessel in the respective two-dimensional image.

6. The method of claim 1, wherein detecting at least one reference object comprises detecting humans as reference objects.

7. The method of claim 6, wherein each human is assumed to have a width of 2 ft.

8. The method of claim 1, wherein monitoring the scene comprises monitoring at least a portion of a passageway for vessels.

9. The method of claim 1, wherein at least the pixel width of a reference object is determined as the pixel width of a bounding rectangle of the reference object, wherein the bounding rectangle represents the maximum extents of the reference objects in the respective two-dimensional training image or the pixel width of a vessel is determined as the pixel width of a bounding rectangle of the vessel, wherein the bounding rectangle represents the maximum extents of the vessel in the respective two-dimensional image.

10. The method of claim 1, wherein at least the pixel height of a reference object is determined as the pixel height of a bounding rectangle of the reference object, wherein the bounding rectangle represents the maximum extents of the reference objects in the respective two-dimensional training image or the pixel height of a vessel is determined as the pixel height of a bounding rectangle of the vessel, wherein the bounding rectangle represents the maximum extents of the vessel in the respective two-dimensional image.

11. A system for estimating at least a length of a vessel, the system comprising:

a camera for monitoring a scene and obtaining two-dimensional images from said scene; and an image processing device operatively coupled to the camera, the image processing device comprising a processor and a memory operatively coupled to the processor, the memory storing instructions to cause the processor to perform operations comprising:

processing at least a portion of a first plurality of two-dimensional images provided by the camera using an object detection algorithm in order to detect at least one reference object in at least one two-dimensional image of the first plurality of two-dimensional images wherein each reference object is assumed to have a same reference width;

using at least one two-dimensional image of the first plurality of two-dimensional images in which at least one reference object was detected as a training image and determining, for each training image, a pixel position and at least a pixel width of each reference object in the respective training image;

creating a width scaling model based on the determined pixel positions of the reference objects and the determined pixel widths of the reference objects as well as the reference width of the reference objects, wherein the width scaling model provides a functional relation between a pixel position and a pixel width of an object in a two-dimensional image of the scene on the one hand and a width of the object on the other hand;

processing at least a portion of a second plurality of two-dimensional images provided by the camera using an object detection algorithm in order to detect at least one vessel in at least one of the two-dimensional images of the second plurality of two-dimensional images;

determining a pixel position and at least a pixel width of the vessel in the respective two-dimensional image; and deriving a vessel length estimation for the vessel from the width scaling model based on the pixel position and pixel width of the vessel in the respective two-dimensional image, wherein creating the width scaling model comprises:

creating a three-dimensional width data cloud based on at least the determined pixel positions and pixel widths of the reference objects, wherein the data cloud comprises a plurality of three-dimensional data points, wherein each of the data points represents a pixel position determined for a specific reference object in a specific training image and at least a pixel width or a width scaling value determined for the specific reference object based on the specific training image;

smoothing the three-dimensional width data cloud in at least one dimension, wherein the image processing device is configured to generate the three-dimensional width data cloud from reference objects detected at different pixel positions across a plurality of training images captured at different vessel-relative distances, such that the width scaling model compensates for perspective-induced non-linear scaling across the image field.

12. The system of claim 11, wherein the camera is a camera providing a resolution of at least 3840 pixels in width and at least 2160 pixels in height.

13. A non-transitory computer readable storage medium with instructions stored thereon that, when executed by a processor, cause the processor to perform operations comprising:

processing at least a portion of a first plurality of two-dimensional images provided by the camera using an object detection algorithm in order to detect at least one reference object in at least one two-dimensional image of the first plurality of two-dimensional images wherein each reference object is assumed to have a same reference width;

using at least one two-dimensional image of the first plurality of two-dimensional images in which at least one reference object was detected as a training image and determining, for each training image, a pixel position and at least a pixel width of each reference object in the respective training image;

creating a width scaling model based on the determined pixel positions of the reference objects and the determined pixel widths of the reference objects as well as the reference width of the reference objects, wherein the width scaling model provides a functional relation between a pixel position and a pixel width of an object in a two-dimensional image of the scene on the one hand and a width of the object on the other hand;

processing at least a portion of a second plurality of two-dimensional images provided by the camera using an object detection algorithm in order to detect at least one vessel in at least one of the two-dimensional images of the second plurality of two-dimensional images;

determining a pixel position and at least a pixel width of the vessel in the respective two-dimensional image; and deriving a vessel length estimation for the vessel from the width scaling model based on the pixel position and pixel width of the vessel in the respective two-dimensional image, wherein creating the width scaling model comprises:

creating a three-dimensional width data cloud based on at least the determined pixel positions and pixel widths of the reference objects, wherein the data cloud comprises a plurality of three-dimensional data points, wherein each of the data points represents a pixel position determined for a specific reference object in a specific training image and at least a pixel width or a width scaling value determined for the specific reference object based on the specific training image;

smoothing the three-dimensional width data cloud in at least one dimension, and wherein the instructions cause the processor to generate the three-dimensional width data cloud from reference objects detected at different pixel positions across a plurality of training images captured at different vessel-relative distances, such that the width scaling model compensates for perspective-induced non-linear scaling across the image field.

14. The method of claim 1, wherein deriving a vessel length estimation from the width scaling model comprises:

deriving a width scaling value from the width scaling model based on the pixel position of the vessel in the respective two-dimensional image and calculating the vessel length estimation based on the scaling value and the pixel width of the vessel.

* * * * *